United States Patent
Fiori et al.

(10) Patent No.: US 8,259,000 B2
(45) Date of Patent: Sep. 4, 2012

(54) REPLY DETECTION IN A SECONDARY SURVEILLANCE RADAR

(75) Inventors: Fabrizio Fiori, Rome (IT); Gaspare Galati, Rome (IT); Stefano Gelli, Rome (IT); Emilio Giuseppe Piracci, Lariano (IT)

(73) Assignee: Selex Sistemi Integrati S.p.A., Rome (IT)

( * ) Notice: Subject to any disclaimer, the term of this patent is extended or adjusted under 35 U.S.C. 154(b) by 192 days.

(21) Appl. No.: 12/676,298

(22) PCT Filed: Sep. 3, 2008

(86) PCT No.: PCT/IT2008/000568
§ 371 (c)(1),
(2), (4) Date: Aug. 23, 2010

(87) PCT Pub. No.: WO2009/031176
PCT Pub. Date: Mar. 12, 2009

(65) Prior Publication Data
US 2011/0128180 A1    Jun. 2, 2011

(30) Foreign Application Priority Data
Sep. 3, 2007 (IT) .............................. TO2007A0623

(51) Int. Cl.
*G01S 13/00* (2006.01)
(52) U.S. Cl. ............................. 342/93; 342/36; 342/37
(58) Field of Classification Search ............ 342/29–32, 342/36–40, 93
See application file for complete search history.

(56) References Cited

U.S. PATENT DOCUMENTS

| | | | | |
|---|---|---|---|---|
| 5,089,822 A * | 2/1992 | Abaunza et al. | ............... | 342/30 |
| 5,406,288 A * | 4/1995 | Billaud et al. | ................... | 342/37 |
| 5,455,586 A * | 10/1995 | Barbier et al. | ................... | 342/37 |
| 5,793,326 A * | 8/1998 | Hofele | ............................ | 342/93 |
| 6,819,282 B1 * | 11/2004 | Galati et al. | .................... | 342/37 |
| 7,570,194 B2 * | 8/2009 | Galati | ............................. | 342/30 |
| 8,102,302 B2 * | 1/2012 | Alon | ............................... | 342/36 |
| 2004/0233095 A1 * | 11/2004 | Galati et al. | .................... | 342/37 |
| 2006/0119502 A1 * | 6/2006 | Ootomo et al. | ................... | 342/37 |
| 2007/0252750 A1 * | 11/2007 | Jean et al. | ........................ | 342/40 |
| 2008/0231493 A1 * | 9/2008 | Billaud et al. | ................... | 342/32 |

OTHER PUBLICATIONS

International Search Report in corresponding PCT/IT2008/000568 dated Jan. 27, 2009.
International Preliminary Report on Patentability in corresponding PCT/IT2008/000568 dated Sep. 1, 2009.
Written Opinion in corresponding PCT/IT2008/000568.

(Continued)

*Primary Examiner* — Jack W Keith
*Assistant Examiner* — Peter Bythrow
(74) *Attorney, Agent, or Firm* — Marshall, Gerstein & Borun LLP

(57) ABSTRACT

The present invention relates to a detecting device for detecting an SSR signal having a characteristic structure. The detecting device comprises filtering means matched to the characteristic structure of the SSR signal, and means for maintaining a false-alarm rate at a substantially constant value. The characteristic structure of the SSR signal comprises either a preamble or an initial pulse and a final pulse separated by a fixed dwell time. The means for maintaining a false-alarm rate at a substantially constant value comprise computing means configured to compute a detection threshold on the basis of a signal supplied by the filtering means, and decision means configured to detect the SSR signal on the basis of the detection threshold and of the signal supplied by the filtering means.

9 Claims, 12 Drawing Sheets

OTHER PUBLICATIONS

Galati et al., "Analysis of SSR Signals by Super Resolution Algorithms," Proceedings of the $4^{th}$ IEEE International Symposium in Rome, Italy,Dec. 28, 2004,166-170. IEEE, Piscataway, NJ.

Galati et al., "Decoding Techniques for SSR Mode S Signals in High Traffic Environment," Radar Conference 2005, Oct. 6, 2005, 399-402, IEEE, Piscataway, NJ.

Galati et al., "Multilateration Algorithms for Time of Arrival and Estimation and Target Location in Airports," Radar Conference 2004 First European Amsterdam,Oct. 11, 2004, 293-296, IEEE, Piscataway, NJ.

Galati et al., "Airport Surface Surveillance with a Network of Miniradars," IEEE Transactions on Aerospace and Electronic Systems, Jan. 1, 1999, 331-338, vol. 35, No. 1, IEEE, Piscataway, NJ.

\* cited by examiner

REPLY DETECTION IN A SECONDARY SURVEILLANCE RADAR

TECHNICAL FIELD OF THE INVENTION

The present invention relates to detection of a Secondary-Surveillance-Radar (SSR) signal in a signal received by a radiolocation cooperative system configured to operate with this type of signals.

In particular, the present invention finds advantageous, though non-exclusive, application precisely in the field of Secondary Surveillance Radars (SSRs), to which the ensuing treatment will make explicit reference without this implying any loss of generality.

STATE OF THE ART

As is known, currently, air-traffic control (ATC), carried out by almost all countries throughout the world at least on part of their own air space, is based principally upon radar systems.

Said radar systems comprise radars both of the type referred to as Primary Surveillance Radar (PSR) and of the type referred to as Secondary Surveillance Radar (SSR).

In general, a PSR, via a markedly directive antenna, issues pulses at radiofrequency and receives any reflected echoes. In fact, if a target is "hit" by one of the pulses issued, said pulse is reflected and thus returns to the antenna.

Consequently, the PSR in order to function does not require any special apparatus on board the targets, i.e., does not require an active cooperation from the targets. For this reason, the PSR is defined as a non-cooperative system.

From the non-cooperative nature of the PSR there derives one of its most important problems, namely, the so-called "clutter". "Clutter" is a term used for designating the reception of undesirable echoes due to the reflections of the pulses transmitted by the PSR by objects that are not of interest, such as the surface of the Earth or the sea, atmospheric phenomena, chaff and even swarms of birds and/or insects.

Said extraneous echoes "disturb" the radar viewer and render detection of the aircraft difficult.

A method and arrangement for generating, by means of a Constant False Alarm Rate (CFAR) circuit, a clutter threshold to be used for target detection in PSRs is disclosed in U.S. Pat. No. 5,793,326. In particular, it discloses a process wherein partial registers of a CFAR are subdivided into storage blocks each containing a plurality of cell, and a block sum is formed from sample values stored in each storage block. To form the clutter threshold for a signal under test, the individual block sums are compared in pairs according to a predetermined scheme, during which the greater block sum is determined. From these resulting greater sums, the smallest block sum (minimum) is selected and, from this, the clutter threshold is determined with a predetermined weighing. According to an alternative method, the block sums are sorted according to an order of precedence. Thereafter, a block sum having a predetermined ordered rank is selected from the sorted block sums, and the clutter threshold is determined from this selected sum after a predetermined weighing.

In addition, one of the limits of PSRs is represented by the fact that in the majority of cases only a two-dimensional position of the aircraft is supplied in terms of range and azimuth.

In other words, via the classic PSR it is not possible to determine the height of flight with sufficient accuracy.

Unlike the PSR, the SSR requires active cooperation of the target and, consequently, falls within the category of radiolocation cooperative systems.

Operation of an SSR is described hereinafter.

In detail, an SSR system comprises two fundamental actors: a ground station, equipped with a markedly directive rotating antenna, frequently mounted on the antenna of a corresponding PSR, and a transponder, equipped with an omnidirectional antenna, mounted on a target, typically an aircraft.

The ground station, according to the type of information that it wishes to request from the targets, typically identity and height of flight, transmits by means of the antenna a corresponding interrogation message, or simply interrogation, appropriately encoded.

When the SSR operates in a conventional way the request by the ground station of the identifier code of the flight, i.e., of the SSR identity of the aircraft, is referred to as "A-mode interrogation", or simply "A mode", whereas the request of the height of flight, expressed in hundreds of feet, i.e., the flight level, is referred to as "C-mode interrogation", or simply "C mode".

A conventional-mode interrogation is constituted by two pulses, each having a duration of 0.8 µs, separated by a dwell time that identifies the interrogation mode thereof and, hence, the type of information requested.

FIG. 1 shows a table containing the dwell times between the two pulses transmitted, designated by P1 and P3, according to the interrogation mode.

In particular, for the A mode the dwell time that separates the pulses P1 and P3 is 8±0.2 µs, whilst for the C mode the dwell time that separates the pulses P1 and P3 is 21±0.2 µs.

The ground station normally alternates the transmission of an A-mode interrogation to a C-mode interrogation. This alternation of transmissions is repeated continuously and at a high rate for ensuring detection of the position and of identity of all the aircraft present in the area monitored by the ground station.

Whenever an interrogation is received by the transponder of a target, the transponder itself decodes said interrogation and sends a reply message, or simply reply, containing the data requested.

In particular, FIG. 2 shows the typical structure of a reply.

In detail, as shown in FIG. 2, each reply has a duration of 20.3 µs and is constituted by a series of pulses, each having a duration of 0.45±0.1 µs. The series of pulses always comprises an initial pulse F1 and a final pulse F2, referred to as "framing pulses". All the pulses are separated from one another by an interval of 1 µs. In addition, the pulses comprised between the framing pulses represent the bits of an octal code ABCD, according to the scheme represented once again in FIG. 2, through which the information requested by the interrogation is encoded.

The ground station receives, then, the replies sent by the targets, from which it extracts, by means of appropriate algorithms, the information requested.

In addition, on the basis of the delay time between sending of the interrogation and reception of the reply and on the basis of the direction of the antenna at the moment when the reply is received, the ground station is able to determine also the distance and the azimuth of the aircraft, as occurs in a PSR.

It should be noted how in an SSR the powers used are much lower than in a PSR. In fact, in the SSR it is sufficient to transmit signals with a power such as to exceed the one-way path losses (uplink or downlink), whilst in the PSR the signal transmitted must exceed the two-way path losses (uplink plus downlink), in addition to the inevitable losses due to the non-ideal reflections of the target.

A further peculiarity of the SSR is the use of two distinct frequencies for the interrogations and the replies, which are respectively, 1030 MHz and 1090 MHz.

The main advantage of the SSR as compared to the PSR is constituted by the possibility of obtaining supplementary information from the aircraft, i.e., identity and height of flight. The availability of the apparatus on board the targets enables, in fact, addition of a data-link to the functionalities of the radar.

The capacity of the SSR to supply this additional information has an immense value for the air-traffic controller on the ground, so much so that the SSR has become the main sensor for control of the air traffic itself.

In fact, all the data received and determined by the ground station are converted into reports referred to as "target reports", each of which regards a target.

All the reports are then transmitted to the ATC centres, where the data are displayed to the air-traffic controller on a planimetric monitor, displayed on which is a symbol on the position of each aircraft detected, together with a label that contains the identifier code of the flight, or the corresponding SSR identity (A-mode interrogation), the height of flight, i.e., the flight level (C-mode interrogation), and possibly other data, such as ground speed, direction, etc.

Notwithstanding the indisputable advantages of the SSR, under certain conditions, in particular in the case of high level of air traffic and/or proximity between aircraft, this system, or at least the conventional SSR, i.e., the one described so far, presents certain problems.

In the first place, in the case of presence at a short distance of different aircraft and/or of different aircraft close in azimuth, their replies can be superimposed on one another and, hence, the ground station could decode the signal received erroneously or else might not manage to decode it at all. In this second eventuality the message is rejected and the information lost. This phenomenon is known as "garbling".

A typical case of garbling is shown in FIG. 3, where two aircrafts, designated by 31 and 32, very close in azimuth both fall within the interrogation area of one and the same ground station 33, said interrogation area being represented in FIG. 3 by the angular sector comprised between the two dashed lines.

The replies of the two aircrafts 31 and 32, indicated by the two arrows, to the interrogations of the ground station 33, given the great closeness in azimuth of the two aircrafts 31 and 32, are very likely to arrive superimposed on one another at the ground station 33, which will thus not be able to distinguish them.

Another classic phenomenon that afflicts the conventional SSR is the so-called FRUITing ("False Replies Unsynchronized In Time" or else "False Replies Unsynchronized to Interrogator Transmissions"), due to the fact that the reply of an aircraft, on account of the omnidirectionality of the antenna of the on-board transponder, might be received not only by the ground station that has triggered it but also by other ground stations in the vicinity. The unexpected reply that thus reaches these ground stations may lead to an erroneous decoding because it is superimposed on the replies that have actually been requested by said ground stations, and/or to contradictory position measurements, which finally force the decoders of said ground stations to reject the information.

A typical case of FRUITing is shown in FIG. 4, where an aircraft 41 is in the interrogation area, represented by the angular sector comprised between the two dashed lines, of a first ground station 42 and is hence interrogated by said first ground station 42.

Consequently, the aircraft 41 sends its own reply, which, on account of the typical omnidirectionality of the antenna of the on-board transponder, is transmitted in all directions, as indicated by the arrows.

At the same time, the antenna of a second ground station 43 at that moment is directed towards the portion of air space where the aircraft 41 is present, i.e., the portion of air space represented by the angular sector comprised between the two dashed-and-dotted lines.

Consequently, the reply of the aircraft 41 to the interrogation of the first ground station 42 is received also by the second ground station 43, which, however, is not able to decode said reply because it does not derive from an interrogation made thereby.

In addition, a further problem of the conventional SSR stems from the fact that assigned to each aircraft is an SSR identifier code constituted by four digits in octal code (comprised between 0 and 7), for a total of 4096 addresses. In practice, however, considering current requirements, these addresses are already insufficient since many of them are reserved. If one and the same code is used in nearby areas, then the processing systems have a problem in assigning it to two different flights. Currently, there are approximately ten thousand changes of code per day, and the possibilities of duplication or erroneous assignment are incremented with a consequent increase of the work overload for the crew and the controllers.

Unfortunately, a good co-ordination with the nearby ATC units is not a satisfactory rule given that the sharing of the SSR codes is not always respected by all the adjacent units.

In order to solve or at least attenuate these problems, in the last few years there has been introduced in the SSR, alongside the conventional modes, i.e., A and C modes, also a new interrogation mode called S mode, where the S stands for "Selective", since the interrogations are carried out selectively.

In detail, in the S-mode SSR, each target is associated to a corresponding address that enables a unique identification thereof. Individual addressing of a target is obtained using 24 address bits, through which it is possible to encode up to 16777214 addresses.

Thanks to the individual addressing of the targets a ground station is able to send an S-mode interrogation to just one target.

Likewise, in the S-mode SSR also the ground stations are associated to a 4-bit address, called "Interrogator Identity" (ii), in such a way that also the S-mode replies of the targets are sent only to the ground station that has interrogated them. Said address envisages an extension of the S mode that will be used with limited functionalities (SI Code).

In addition, in the S-mode SSR it is possible to request and send much more information as compared to just information on identity (A mode) and altitude (C mode).

Consequently, in the S-mode SSR, the rate of replies and hence the interference is reduced, given that only one reply per target per scan is necessary, and said reply contains the information on identity and altitude of flight, thus preventing the need for the ground station to correlate A-mode and C-mode replies of one and the same target.

This result by itself has enabled elimination of approximately 90% of the problems linked to garbling and FRUITing.

The signals of S-mode interrogation and reply are compatible with existing apparatuses that function with the conventional modes, given that it has been deemed inappropriate that one and the same target should transport two different apparatuses, one to be used where the S mode is already operative, and the other where it is not yet operative.

Precisely in order to meet the requirement on the compatibility, S mode uses the same frequencies already in use for the conventional SSR, i.e., 1030 MHz for the interrogations and 1090 MHz for the replies.

There exist two types of S-mode interrogations: interrogations called "A/S All-call interrogations" and interrogations called "Roll-call interrogations".

In particular, the A/S All-call interrogations request and obtain a reply from each target that receives said type of interrogation. The ground station transmits periodically an A/S All-call interrogation so as to know the addresses or identities of all the targets within the range of its own antenna.

FIG. 5 shows the typical structure of an A/S All-call interrogation.

In detail, as shown in FIG. 5, the A/S All-call interrogation is constituted by three pulses, the first two of which, designated in the figure by P1 and P3, have a duration of 0.8 μs and are separated by a dwell time equal to 8±0.2 μs, whilst the third pulse, designated in the figure by P4, has a duration of 1.6 μs and is separated from P3 by 1 μs.

As may be readily appreciated, the A/S All-call interrogation has the structure just described precisely to meet the requirement on the compatibility with the conventional modes.

In fact, when a target equipped with a transponder of a conventional type receives an A/S All-call interrogation, it recognizes, in the first two pulses, i.e., P1 and P3, an A-mode interrogation, and sends a reply containing its own identifier code.

Instead, a target equipped with an S-mode transponder, when it receives an A/S All-call interrogation, sends a reply containing its own address.

Roll-call interrogations, instead, are selectively addressed so that only the target to which the interrogation is addressed replies by sending a reply containing the information requested only to the ground station that has interrogated it.

FIG. 6 shows the typical structure of a Roll-call interrogation.

In detail, as is shown in FIG. 6, the S-mode Roll-call interrogation is constituted by two pulses, designated in the figure by P1 and P2, of the duration of 0.8 μs each and at a distance of 1 μs from one another, followed by a data block, designated in FIG. 6 by P6, having a duration of 16.25 μs.

The pulses P1 and P2 have only the purpose of "cutting out" the targets equipped with transponders of a conventional type, whilst the data block P6 contains 56 bits, encoded in which, by means of a Differential-Phase-Shift-Keying (DPSK) digital modulation, are the address of the target interrogated and the interrogation data.

Alternatively, the data block P6 of an S-mode interrogation can also contain 112 bits and last 32.25 μs.

In addition, FIG. 7 shows the typical structure of an S-mode reply.

In detail, as shown in FIG. 7, the S-mode reply comprises a preamble, having a duration of 8 μs, and a data block, having a duration of 56 μs.

The preamble is constituted by four pulses, each of which has a duration of 0.5 μs. In the preamble, the first and second pulses are separated from one another by a dwell time of 0.5 μs, and the third and fourth pulses are also separated from one another by a dwell time of 0.5 μs. Once again in the preamble, the first and third pulses are separated from one another by a dwell time of 3.5 μs.

The data block contains 56 pulses, each having a duration of 0.5 μs, which encode, by means of a pulse-position modulation (PPM), the ii address of the ground station to which it is wished to reply and the reply information.

The last 24 pulses contain a cyclic-redundancy-check (CRC) code for improving the reliability of coding.

In conclusion, in the S mode all the necessary data are contained in a single reply and the exactness of the data is confirmed by the 24-bit parity check. Instead, the information of the A and C modes is sent separately and must be associated correctly by the ground station. The exactness of the data is not guaranteed, and a validation can be obtained only by comparing the replies corresponding to the different scans of the antenna.

Consequently, S mode improves considerably the performance of the conventional SSR and solves many of the problems encountered therein.

At this point, for a complete understanding of the invention that will be described hereinafter, there follows a brief description of the processing carried out by a typical SSR ground station in relation to the reception of the replies of the targets interrogated.

In particular, a typical SSR ground station comprises, as has already been said, a markedly directive rotating antenna, coupled to processing means for processing the signals received by the antenna.

Said processing means comprise analogic-processing means and digital-processing means coupled together.

In particular, in reception the analogic-processing means perform the following main functions:
  they acquire the signals received from the antenna, called in a known way Σ, Δ and Ω;
  they appropriately filter said acquired signals for a self-protection from signals that are too high in band;
  they carry out a first conversion of the filtered signals from the radio frequency (RF), i.e., 1090 MHz, to the intermediate frequency (IF), typically 60 MHz;
  they provide an appropriate filtering of the IF signals according to the standards of the International Civil Aviation Organization (ICAO);
  they amplify the signals appropriately filtered with a set of three logarithmic amplifiers, maintaining amplitude and phase adaptation; and
  they carry out a second conversion from IF to video of the amplified signals.

Once again in reception, the digital-processing means, instead, perform the following main functions:
  they carry out an analogic-to-digital conversion of the video signals coming from the analogic-processing means;
  they identify the rising and falling edges of the pulses present in the digital video signals;
  they reconstruct the pulses on the basis of the rising and falling edges identified;
  on the basis of the mutual arrangement in time of the reconstructed pulses, they identify the framing pulses of the conventional replies, and, hence, the conventional replies, and/or the preambles of the S-mode replies, and, hence, the S-mode replies; and
  they appropriately decode the conventional replies and/or the S-mode replies identified extracting therefrom the information requested.

Identification of the conventional replies and/or of the S-mode replies carried out by the digital-processing means of the SSR ground stations of a known type is consequently based upon detection of the framing pulses and/or of the preambles on the basis of the mutual arrangement in time of the reconstructed pulses.

In fact in A-mode, C-mode, and S-mode replies the mutual arrangement in time of the pulses, and in particular of the framing pulses and of the preamble, as described extensively previously, is fixed, thus being a discriminating factor for the purposes of their detection and identification.

In addition, as is known, the digital-processing means comprise a plurality of processors, typically at least four, which operate in parallel and are configured to decode conventional replies, i.e., A-mode and C-mode replies, and a processor configured to decode S-mode replies.

If the digital-processing means identify a conventional reply, the corresponding pulses are supplied to one of the processors configured to decode conventional replies in order to carry out decoding thereof, whereas if they identify an S-mode reply, the corresponding pulses are supplied to the processor configured to decode S-mode replies in order to carry out decoding thereof.

In addition, in the case of identification of a preamble and, hence, of an S-mode reply, the digital-processing means generally inhibit the processors configured to decode conventional replies.

This choice is due to the fact that in the data block of an S-mode reply, it is possible to recognize erroneously up to thirty pairs of framing pulses.

Further examples of S-Mode reply decoding are disclosed in G. Galati, S. Bartolini, L. Mené, *Analysis of SSR Signals by Super Resolution Algorithms*, Proceedings of the Fourth IEEE International Symposium on Signal Processing and Information Technology, 18-21 Dec. 2004, Rome, Italy, pages 166-170. In particular, this article discloses a method for SSR signal analysis, in particular SSR Mode S replies, obtained exploiting the super resolution algorithms capability to discriminate signals in the frequency domain. This article summarises the results obtained by the application of Tufts-Kumaresan, Music, Esprit and Unitary Esprit algorithms to decode Mode S replies and squitters acquired in a live environment. Hence, this article proposes 16 possible processing schemes which, compared to conventional schemes, show sensible improvements. It results that the main limit is represented by the quality of the on board transponder local oscillator which causes a too small spectral separation between two overlapped signals.

OBJECT AND SUMMARY OF THE INVENTION

Even though the introduction of the S mode has served to reduce the known problems of the Secondary Surveillance Radar linked to the garbling and FRUITing effect, it has been noted that said S mode, and in particular the S-mode replies, create a sort of FRUIT effect on the conventional replies.

In fact, it has been noted that in a scenario in which S-mode replies characterized by a low signal-to-noise ratio (SNR) are received, the current approach of detection of the reply mode, based upon the identification of the framing pulses and/or of the preambles on the basis of the mutual arrangement in time of the pulses reconstructed in reception, does not prove very reliable given that the preambles reconstructed in reception are characterized by a high level of noise and are hence difficult to identify.

In a scenario of the above sort, i.e., in the case of an S-mode reply characterized by a low SNR and hence not identified, the current approach of detection of the reply mode also leads to an erroneous identification, within the data block of said S-mode reply, of up to thirty pairs of framing pulses and hence to an erroneous identification of, and to an attempt to process, up to thirty conventional replies.

All this leads to the saturation of the processing capacity of the digital-processing means, which, as has been said previously, comprise at least four processors in parallel configured for decoding conventional replies.

Consequently, if one or more conventional replies are superimposed on an S-mode reply not identified by the digital-processing means of an SSR ground station, said conventional replies, in turn, may not be either identified or, even less, processed by the processors configured to decode conventional replies, because the latter can be saturated by the up to thirty "false" conventional replies erroneously identified in the data block of the S-mode reply not identified.

All this entails the loss of the information contained in the conventional replies and hence to lack of identification of one or more targets by the ground station of an SSR.

A situation as the one just described is shown in FIG. 8, where there may be noted an S-mode reply superimposed on which is an A-mode reply.

In the case where the preamble of the S-mode reply were not to be detected, the four processors configured to decode conventional replies would be saturated by the passage of the first part of the data block of the S-mode reply, and the A-mode reply would not be detected or processed.

In addition, when an SSR ground station, which has sent an S-mode interrogation to a target, does not receive the corresponding reply, because it is not identified by its own digital-processing means, said SSR ground station re-interrogates the target until its own digital-processing means are able to identify and to decode correctly the corresponding S-mode reply, thus risking continuous loss of one or more conventional replies if the processors configured to decode conventional replies are saturated by the false conventional replies identified in the data block of the S-mode replies not identified.

In this way, it would be possible to set off a vicious circle, which could even lead to a constant lack of identification of a plurality of targets equipped with conventional transponders.

If added moreover to this is the fact that the downlink radio channel at 1090 MHz in the future will be used also by other systems, such as Traffic Collision Avoidance System (TCAS), Automatic Dependent Surveillance-Broadcast (ADS-B), Multilateration, Traffic Information System-Broadcast (TIS-B) and Flight Information System-Broadcast (FIS-B), with consequent increase in the interference, reducing the SNR of the S-mode replies received and thus reducing the probability of detection of a preamble, it may be readily understood how, in the future, the performance of the conventional SSR could be seriously jeopardized since there might no longer be guaranteed proper detection and decoding of conventional replies.

Consequently, the aim of the present invention is to provide a solution that allows the problems referred to above to be alleviated.

The aforesaid aim is achieved by the present invention in so far as it relates to a Secondary Surveillance Radar as defined in the annexed claims.

BRIEF DESCRIPTION OF THE DRAWINGS

For a better understanding of the present invention, some preferred embodiments thereof, which are provided purely by way of explanatory and non-limiting example, will now be illustrated with reference to the annexed drawings (not all of which are in scale), wherein.

DETAILED DESCRIPTION OF PREFERRED EMBODIMENTS OF THE INVENTION

Figures 1, 2:
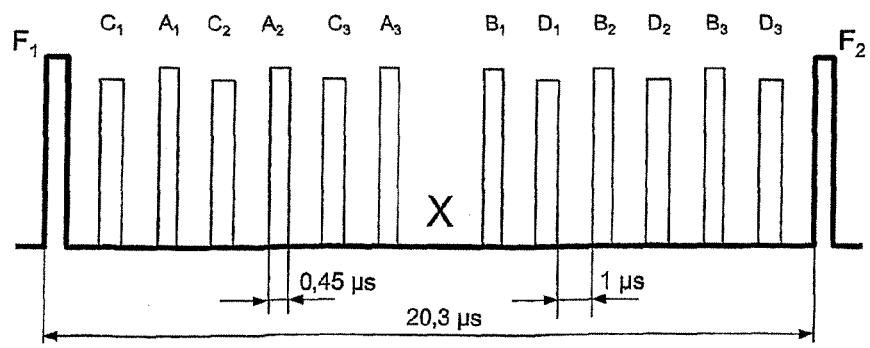
FIG. 1 shows a table containing the dwell times between the pulses of a conventional interrogation of a Secondary Surveillance Radar according to the conventional interrogation mode.
FIG. 2 shows the typical structure of a conventional reply in a Secondary Surveillance Radar.
Figure 3:
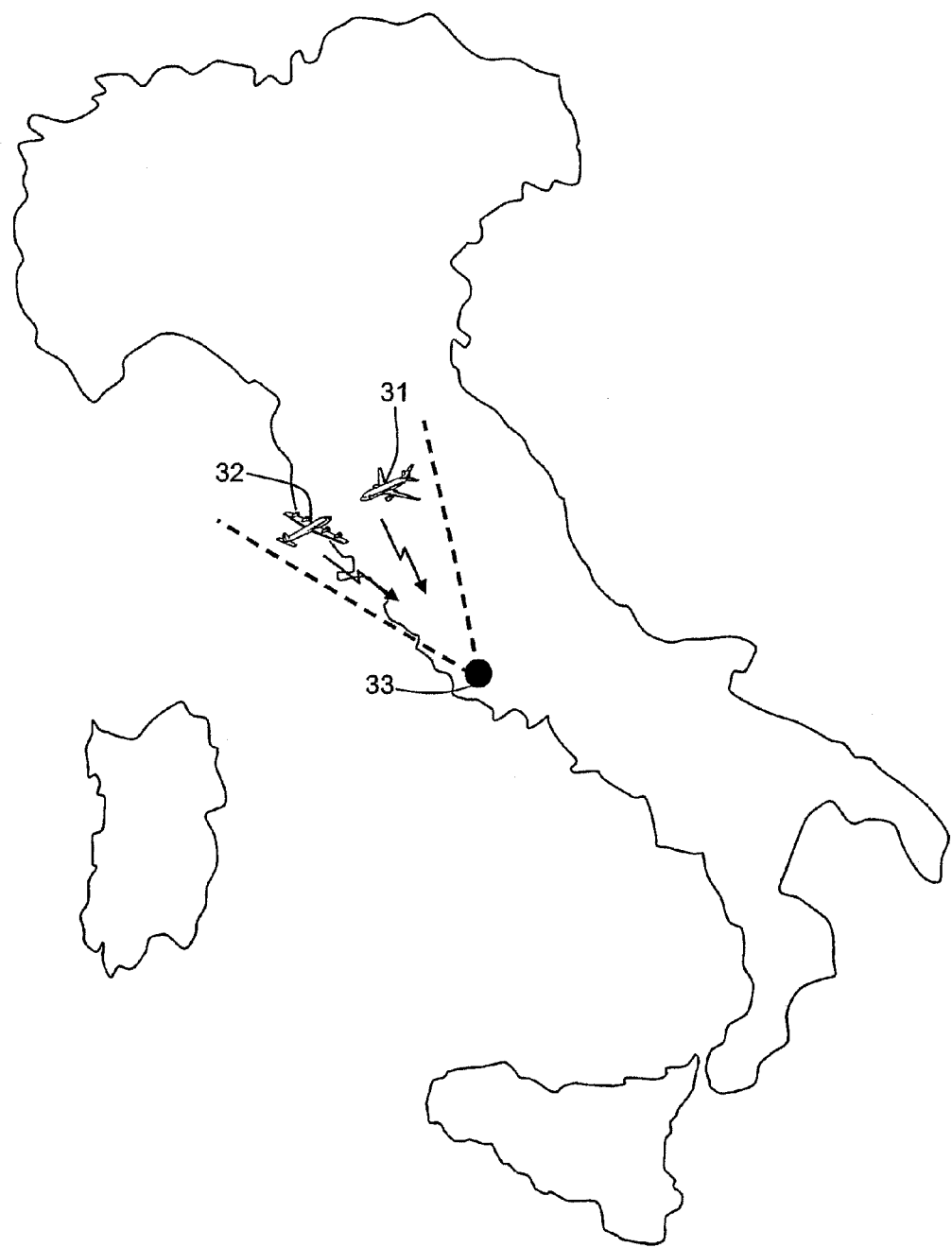
FIG. 3 shows a conventional Secondary Surveillance Radar affected by garbling.
Figure 4:
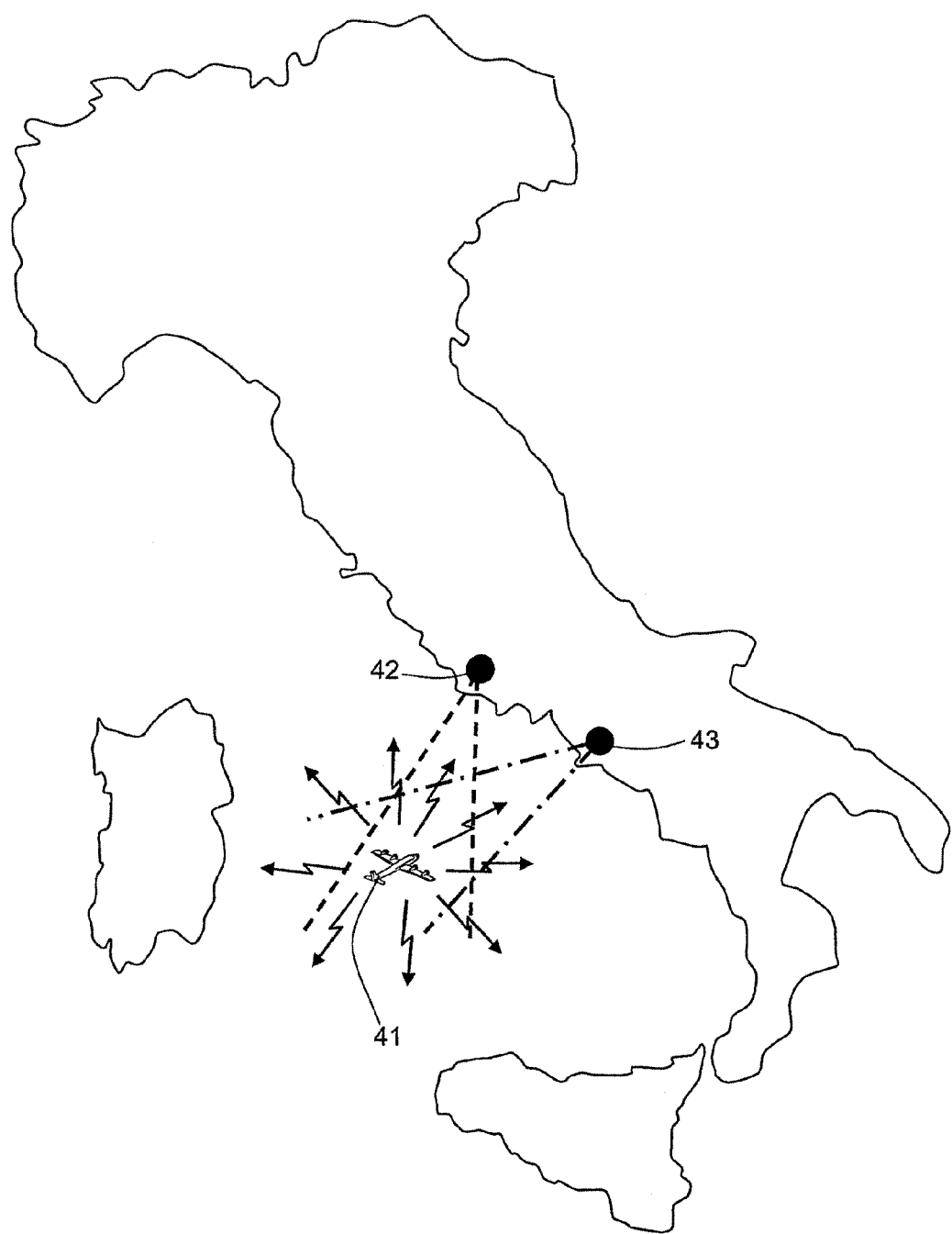
FIG. 4 shows a conventional Secondary Surveillance Radar affected by FRUITing.
Figure 5:
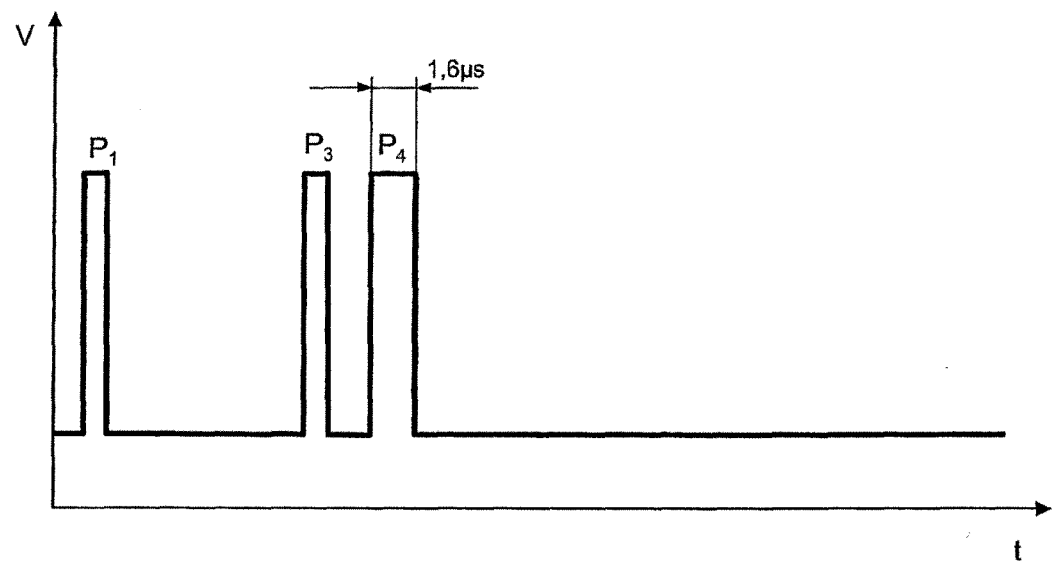
FIG. 5 shows the typical structure of an S-mode A/S All-call interrogation of a Secondary Surveillance Radar.
Figure 6:
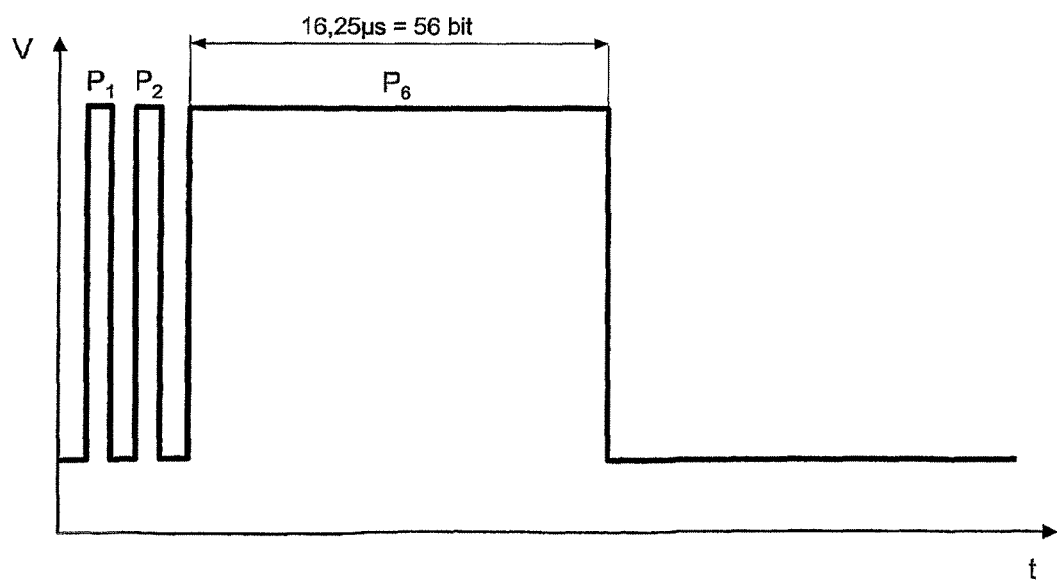
FIG. 6 shows the typical structure of an S-mode Roll-call interrogation of a Secondary Surveillance Radar.
Figure 7:
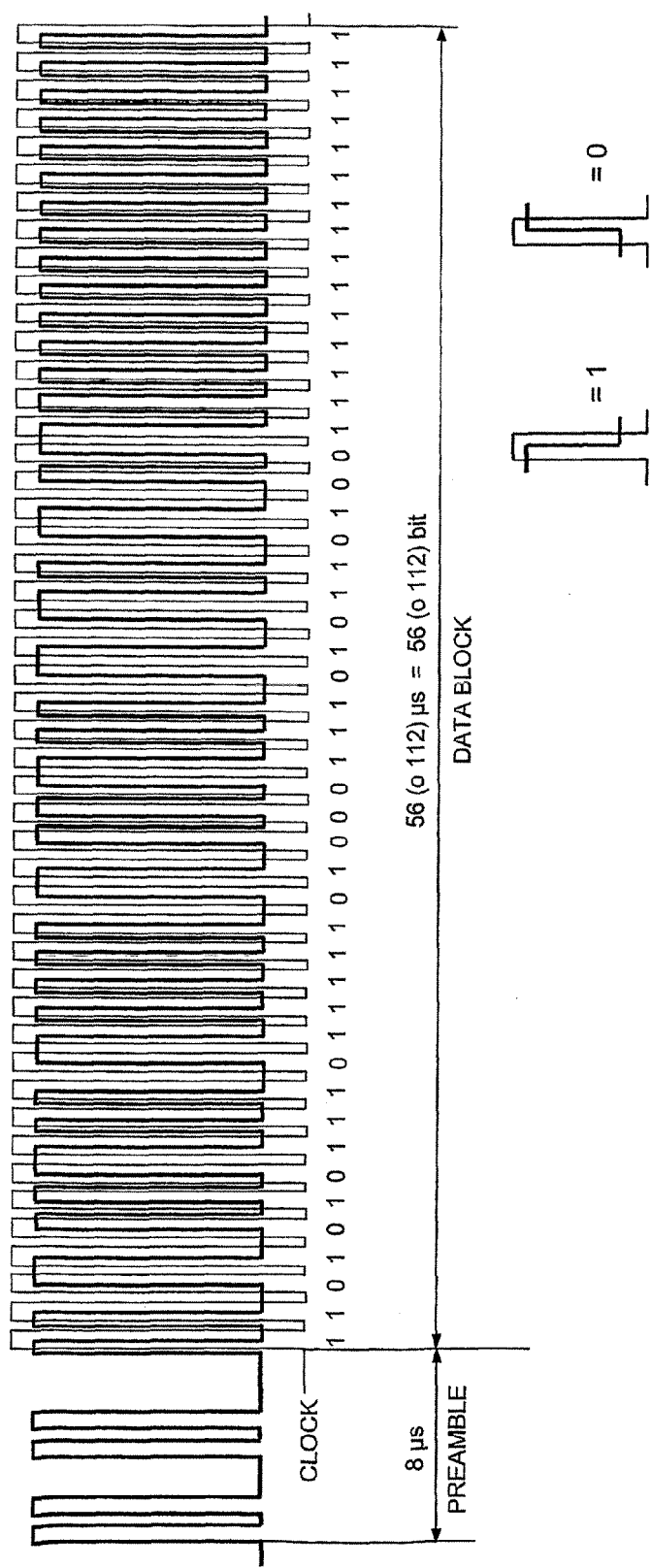
FIG. 7 shows the typical structure of an S-mode reply in a Secondary Surveillance Radar.
Figure 8:
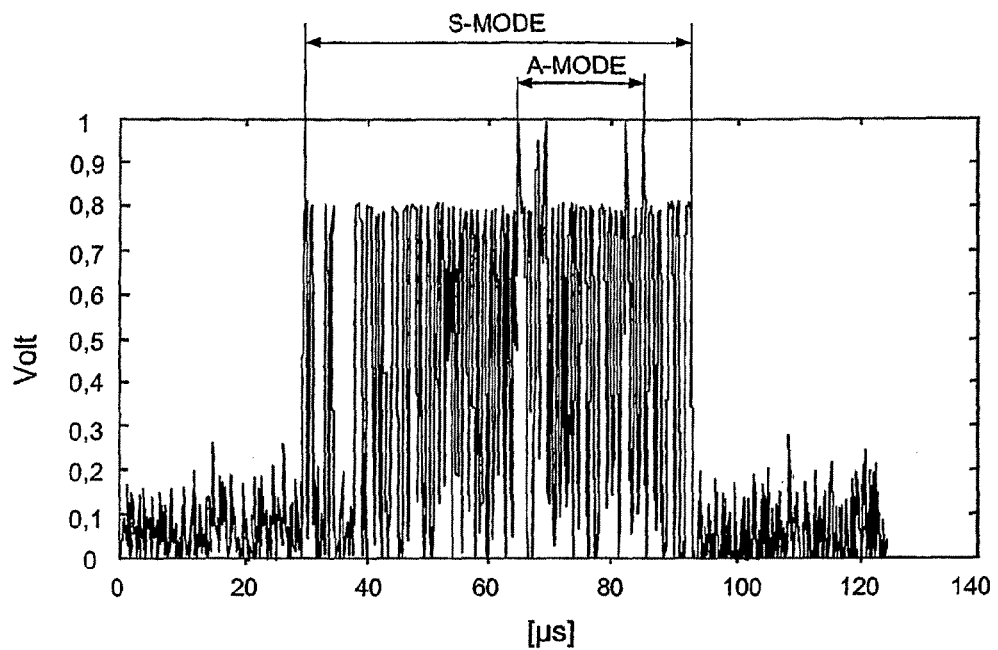
FIG. 8 shows the time evolution of an S-mode reply and of a superimposed conventional reply.

The ensuing description is provided to enable a person skilled in the sector to implement and use the invention. Various modifications to the embodiments presented will be immediately evident to skilled persons, and the general principles disclosed herein could be applied to other embodiments and applications, without thereby departing from the scope of protection of the present invention.

Hence, the present invention must not be understood as being limited to just the embodiments described and illustrated, but it must be granted the widest possible scope of protection, consistently with the principles and characteristics presented herein and defined in the annexed claims.

According to the present invention, are advantageously exploited in the SSR, in order to counter the FRUITing effect of the S-mode replies on the conventional replies, techniques that guarantee a Constant False-Alarm Rate (CFAR), already used in the field of PSRs to solve the problem of clutter.

In fact, the present invention is the result of an in-depth study that has been developed in order to assess the possibility of adapting the CFAR techniques to the case of the SSR, for which there does not exist the problem of clutter, even though there exists the problem of mutual interference between conventional replies and S-mode replies, to which, in the future, there will be added also the problem of interference caused by different systems that use the same radio channel in downlink, such as TCAS, ADS-B, Multilateration, TIS-B, and FIS-B.

The present invention is implemented by digital-processing means such as general-purpose microprocessors, digital-signal-processing (DSP) devices, field-programmable-gate-array (FPGA) devices, application-specific-integrated-circuit (ASIC) devices, and programmable-array-logic (PAL) devices, of a Secondary Surveillance Radar (SSR), which are hence configured to implement the detecting device for detecting an SSR signal, in particular a conventional reply and/or an S-mode reply, described hereinafter.

In particular, the present invention can be implemented by means of a software program designed to detect, when executed by or loaded into the said digital-processing means, an SSR signal, in particular a conventional reply and/or an S-mode reply, described hereinafter.

In particular, according to the present invention, a detecting device (or detector) for detecting a conventional reply and/or a detecting device for detecting an S-mode reply comprise/comprises:

respectively, a filter matched to the framing pulses of conventional replies, i.e., A/C-mode replies, and/or a filter matched to the preamble of S-mode replies; and a CFAR device.

A matched filter is the optimal linear system, in the sense that it maximizes the SNR in the instant of decision, in the presence of additive noise. The impulse response of the aforesaid matched filter is a scaled and delayed version of the signal to which the filter is matched.

In addition, if present at input to the matched filter is the signal to which the filter is matched, in the absence of noise superimposed on the input signal, the output of the matched filter is the autocorrelation of the input signal.

In SSR systems, both in the conventional modes, i.e., A mode and C mode, and in the selective mode, i.e., S mode, it is possible to exploit the property of the matched filters for detecting the framing pulses of a conventional reply and/or the preamble of an S-mode reply, unlike known SSR systems, which instead identify the framing pulses and/or the preamble on the basis of the mutual arrangement in time of the pulses reconstructed in reception.

Consequently, according to the present invention, detection of an S-mode reply is obtained by means of a detection of the corresponding preamble based upon the use of a filter matched to the preamble, whilst detection of a conventional reply is obtained by means of a detection of the corresponding framing pulses based upon the use of a filter matched to the framing pulses.

Figure 9:
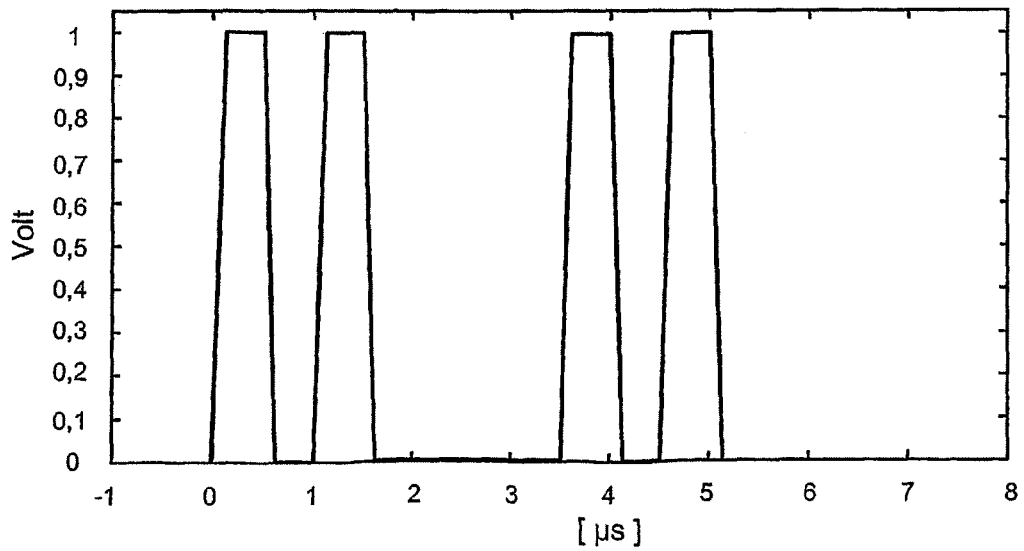
FIG. 9 shows the impulse response of a filter matched to the preamble of an S-mode reply according to the present invention.

In order to detect a preamble and, hence, to detect the corresponding S-mode reply, a filter matched to the preamble is used, the impulse response of which is a scaled and delayed version of the preamble itself, said impulse response being shown in FIG. 9.

In particular, the pulses shown in FIG. 9 are the typical ones of a preamble that respects the specifications of the ICAO standard in terms of duration of the pulse (0.5 µs), jitter, and duration of the rising and falling edges of the pulses.

Consequently, the filter matched to the preamble returns at output a correlation of the input signal with the reference signal, or signal to which the filter is matched, i.e., the preamble.

The filter matched to the preamble can be conveniently obtained by means of a Finite-Impulse-Response (FIR) filter.

Figure 10:
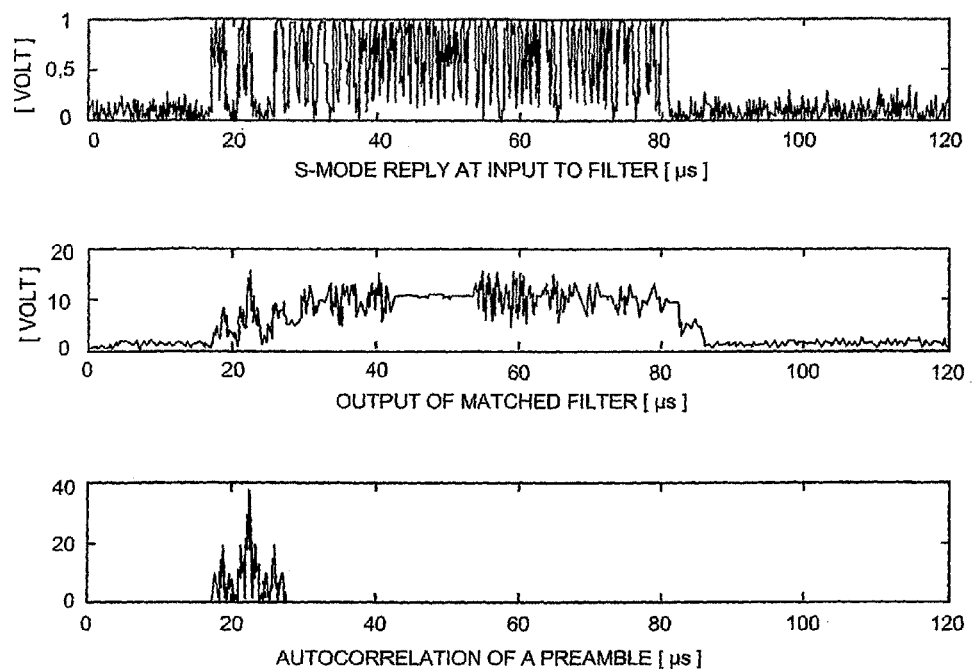
FIG. 10 presents three graphs, in which the top one shows the evolution in time of an S-mode reply at input to the filter matched to the preamble of an S-mode reply according to the present invention, the one at the centre shows the time evolution of the output of said filter, and the one at the bottom shows the autocorrelation of a preamble of an S-mode reply.

Operation of the filter matched to the preamble on an S-mode reply is shown in FIG. 10, where the graph at the top shows the time evolution of an S-mode reply at input to the filter matched to the preamble that produces at output the waveform shown in the graph at the centre, where readily recognizable is the characteristic pattern of the autocorrelation of an S-mode preamble, highlighted in the graph at the bottom.

Figure 11:
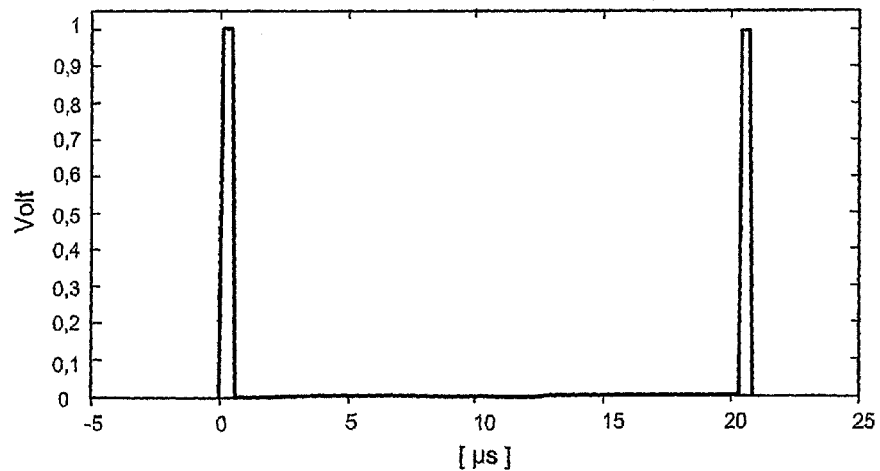
FIG. 11 shows the impulse response of a filter matched to the framing pulses of a conventional reply according to the present invention.

In order to detect the framing pulses and hence the corresponding conventional reply, i.e., A-mode reply or C-mode reply, there is, instead, used a filter matched to the framing pulses, the impulse response of which is a scaled and delayed version of the framing pulses themselves, said impulse response being shown in FIG. 11.

In particular, the pulses shown in FIG. 11 are the ones typical of framing pulses that respect the specifications of the ICAO standards in terms of duration of the pulse (0.45 µs), jitter, and duration of the rising and falling edges of the pulses.

Consequently, also the filter matched to the framing pulses returns at output a correlation of the input signal with the reference signal, or signal to which the filter is matched, i.e., the framing pulses.

Also the filter matched to the framing pulses can be conveniently provided by means of a FIR filter.

In addition, according to the present invention, in order to detect the framing pulses and/or the preamble, a CFAR adaptive technique is used, which hence guarantees a constant false-alarm probability, as well as the maximum detection probability.

Described hereinafter is detection, according to the present invention, of a conventional reply, said detection being based on the use of a filter matched to the framing pulses and of a CFAR device, which adaptively computes a detection threshold on the basis of the output signal of the filter matched to the framing pulses and makes a detection decision by comparing a signal indicating the output signal of the filter matched to the framing pulses with the computed detection threshold.

In this context, the false-alarm rate must be understood as the probability of detecting more than M−1 "false" conventional replies within a data block of an S-mode reply, where M is the number of processors configured to decode conventional replies. The remaining processor is the one that manages to process correctly a possible "true" conventional reply.

The CFAR technique used for framing-pulse detection according to the present invention, as has already been said previously, is applied to the signal at output from the filter matched to the framing pulses.

On the basis of said output signal, the CFAR device according to the present invention carries out an adaptive estimation of a detection threshold used for deciding whether a signal indicating a portion of the signal at output from the filter matched to the framing pulses, referred to as "signal under test", is indicative or not of framing pulses of a conventional reply.

In detail, the signal under test is compared with the detection threshold, which is calculated on the basis of a plurality of portions of the signal at output from the filter matched to the framing pulses, said portions being adjacent to the portion represented by the signal under test.

The signal under test is not used in the calculation of the detection threshold to prevent, thus, an overestimate of said detection threshold in the case where the signal under test represents framing pulses.

In addition, in the calculation of the detection threshold some portions immediately adjacent to the one represented by the signal under test are rejected to prevent, thus, any possible extensive framing pulses, i.e., represented by different adjacent portions, from raising the detection threshold excessively, thus masking the framing pulses themselves. Said rejected portions are referred to as "guard portions".

Figure 12:
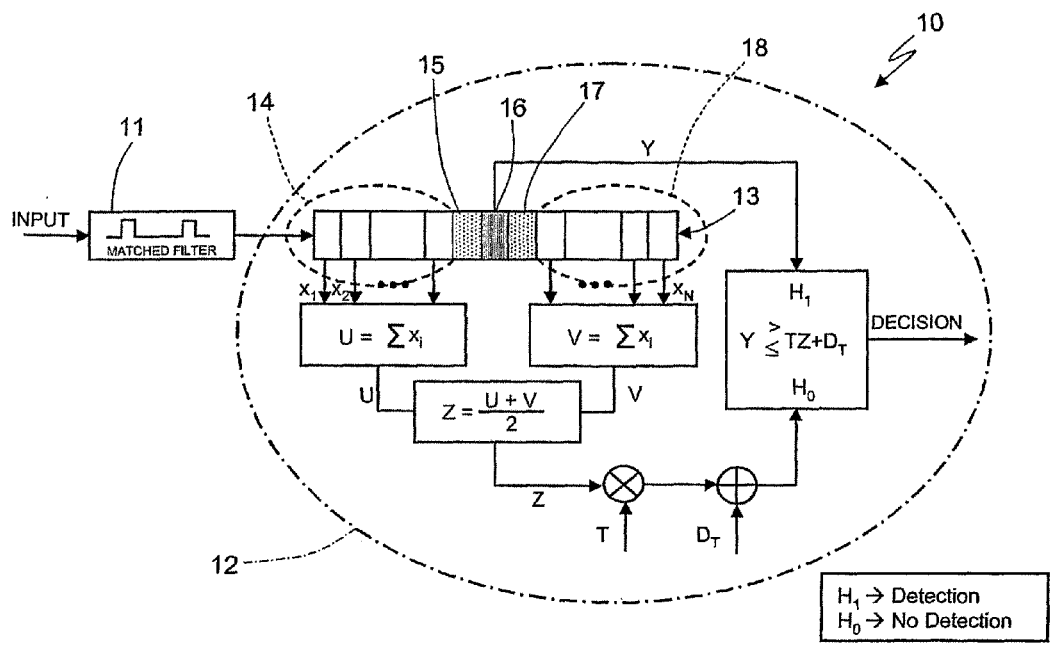
FIG. 12 shows a detector for detecting the framing pulses of a conventional reply according to the present invention.

In detail, FIG. 12 shows a framing-pulse detector 10, i.e., a detecting device for detecting a conventional reply, according to the present invention, which comprises a filter matched to the framing pulses 11 and a CFAR device 12.

In particular, as shown in FIG. 12, in the CFAR device 12 the signal at output from the filter matched to the framing pulses 11 is loaded in a shift register or buffer 13 of N cells, each having a time width of t µs.

Of the N cells of the buffer 13, the first $N_1$ are called "leading cells" 14 and are followed by a first guard cell 15, by a Cell Under Test (CUT) 16, by a second guard cell 17, and by $N_1$ cells called "lagging cells" (or sometimes "trailing cells") 18, with $2N_1+3=N$.

The samples of the signal at output from the filter matched to the framing pulses 11, loaded into the buffer 13, are averaged within the corresponding cell in which they are loaded.

As shown in FIG. 12, said averaged values are then added separately between the leading cells 14 and the lagging cells 18, to yield, respectively, a first value, designated in FIG. 12 by U, and a second value, designated in FIG. 12 by V, of which a further average is calculated to yield a third value, designated by Z.

This third value Z is multiplied by a factor T, and the product T*Z is then added to a detection value $D_T$, such as to detect the presence of a conventional reply in the absence of superpositions with other replies.

In other words, if at input there were only a conventional reply, the third value Z would be small, whilst the detection value $D_T$ must be such as to guarantee in any case detection thereof.

The value $Z*T+D_T$, which is the detection threshold, is compared with the value Y, which is equal to the average of the samples in the CUT 16, to decide whether Y represents the framing pulses or not.

In particular, when Y is greater than the detection threshold $Z*T+D_T$ a pair of framing pulses is detected and thus a conventional reply.

The detector 10 was tested using a number $N_1$ of leading cells 14 and a number $N_1$ of lagging cells 18 equal to 9, and signals at input to the filter matched to the framing pulses 11 normalized to 1.

As regards the time width t of each cell, it may be noted that the correlation peak between two pulses each of 0.45 µs has a width of approximately 1 µs. Consequently, the time width of each cell t was set equal to 1 µs.

In addition, the factor T was determined empirically and set equal to 1.2, whilst the detection value $D_T$ is equal to 6 at a sampling frequency of 1.6 MHz.

Figure 13:
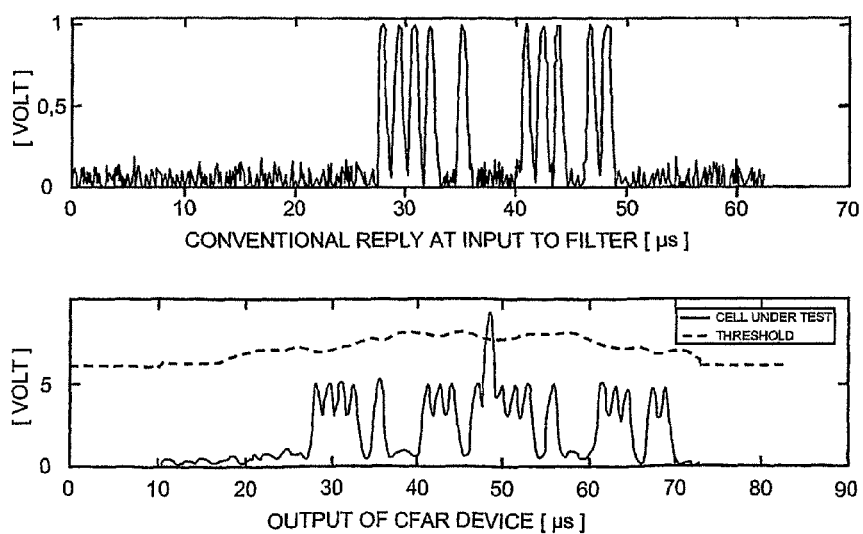
FIG. 13 presents two graphs, where the top one shows the time evolution of a conventional reply at input to the framing-pulse detector of FIG. 12, and the bottom one shows the time evolution of outputs of the detector of FIG. 12.

FIG. 13 shows, in the graph at the top, the time evolution of a conventional reply at input to the filter matched to the framing pulses 11, and, in the graph at the bottom, the time evolution of the signal Y and of the corresponding detection threshold $Z*T+D_T$ calculated by the CFAR device 12.

In the graph at the bottom in FIG. 13 it should be noted how the detection threshold $Z*T+D_T$ is exceeded by the signal Y only at the correlation peak, which coincides with the passage of the second framing pulse in the filter matched to the framing pulses 11.

Figure 14:
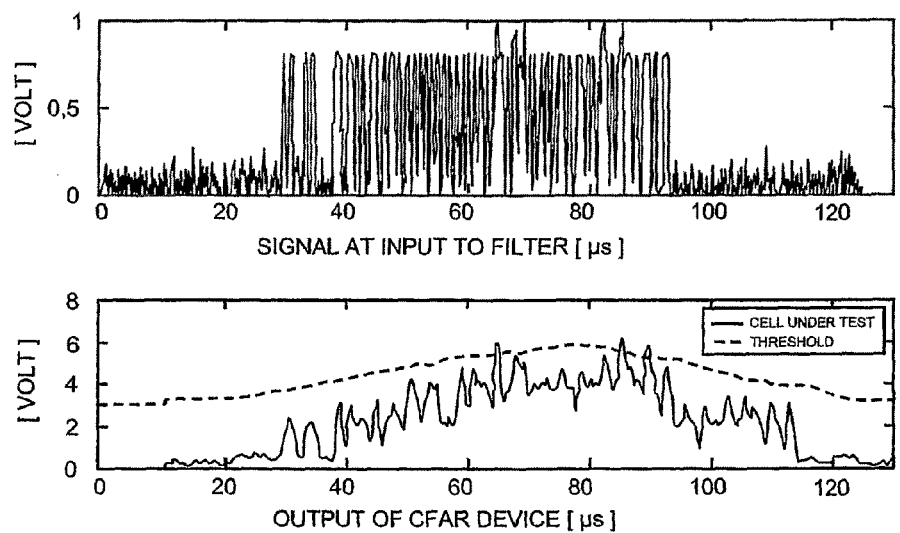
FIG. 14 presents two graphs, where the top one shows the time evolution of two superimposed replies, a conventional one and an S-mode one, at input to the detector of FIG. 12, and the bottom one shows the time evolution of outputs of the detector of FIG. 12.

FIG. 14 shows, instead, in the graph at the top, the time evolution of two superimposed replies, a conventional one and an S-mode one, at input to the filter matched to the framing pulses 11, and, in the graph at the bottom, the time evolution of the signal Y and of the corresponding detection threshold $Z*T+D_T$ calculated by the CFAR device 12.

In the graph at the bottom in FIG. 14 it may be noted how the signal Y exceeds the detection threshold $Z*T+D_T$ in a number of points, three to be precise, of which just one, namely, the central one, coincides with the passage of the second framing pulse in the filter matched to the framing pulses 11 and is, hence, of interest.

The fact that the detection threshold $Z*T+D_T$ is exceeded in a number of points should not be of concern, in so far as, normally, are available at least four processors in parallel configured to decode conventional replies. Hence, the important point is that it should not be exceeded in more than four points.

The step forwards, as compared to the traditional detection approach in which up to thirty pairs of potential framing pulses were detected, is considerable.

The detector 10 described so far was also tested on conventional replies immersed in S-mode and A/C-mode FRUITing. In particular, 10000 FRUITs per second were considered, of which 70% of A/C mode and 30% of S mode.

The conventional replies of the known target were received with a power of −50 dBm, corresponding to an average distance, whilst the power of the FRUITs was varied from −70 dBm to −40 dBm.

Figure 15:
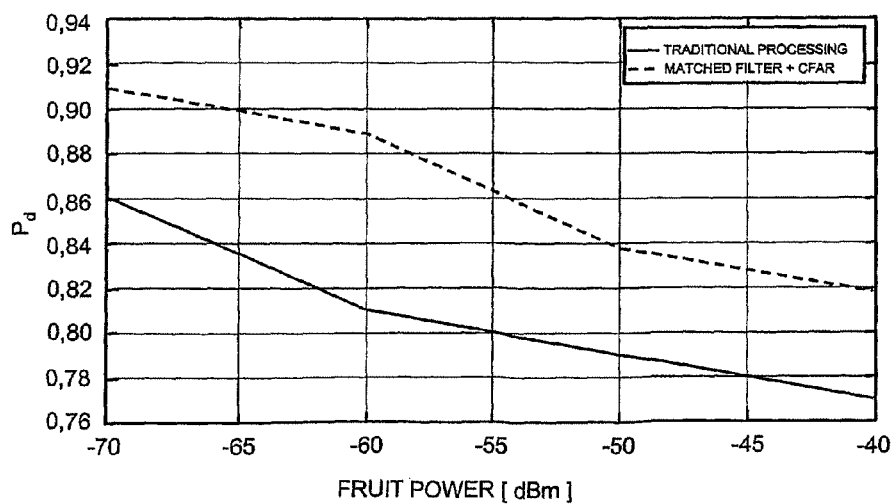
FIG. 15 shows the probability of detection of framing pulses of a conventional reply, according to the present invention and according to the traditional detection approach, as a function of the FRUITing powers, i.e., of the powers of conventional replies and S-mode replies that interfere with one another.

FIG. 15 shows the probability Pd of detection of the framing pulses of the conventional replies of the known target, both for the detector 10 tested and according to the traditional detection approach, as a function of the FRUITing powers, i.e., of the powers of the S-mode and A/C-mode replies interfering with one another.

In particular, in FIG. 15 it may be noted how the detection of framing pulses according to the present invention gains quite several percentage points of detection probability Pd for all the FRUITing powers considered as compared to the traditional detection approach.

Described hereinafter is, instead, detection, according to the present invention, of S-mode replies, a detection which, making the necessary changes with respect to the detection of framing pulses of conventional replies, is based upon the use of a filter matched to the preamble and of a CFAR device that computes adaptively a detection threshold on the basis of the output signal of the filter matched to the preamble, and that makes a detection decision by comparing a signal indicating the signal at output from the filter matched to the preamble with the computed detection threshold.

Figure 16:
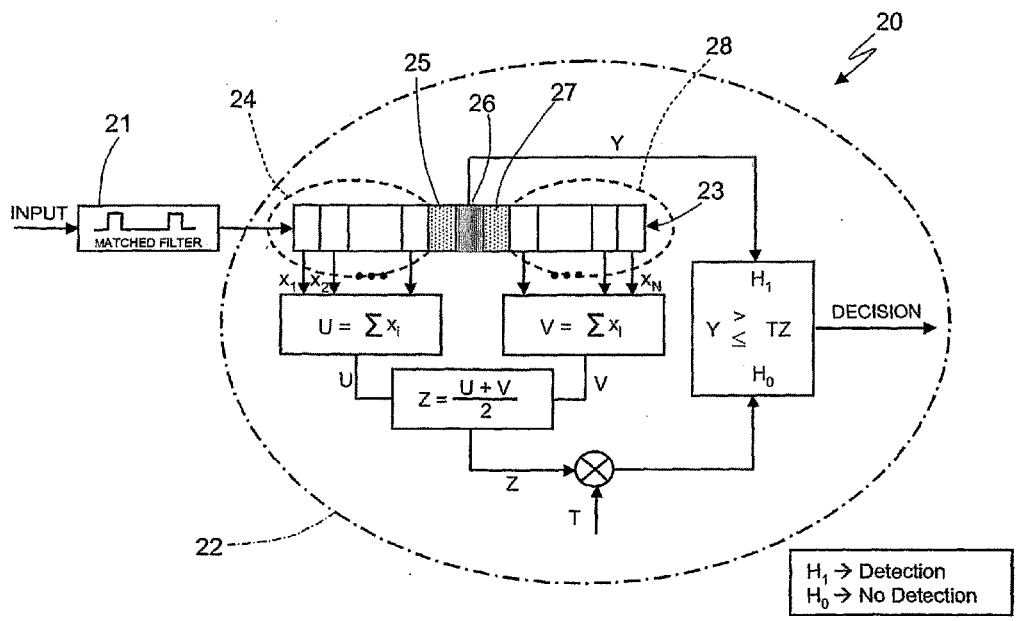
FIG. 16 shows a detector for detecting the preamble of an S-mode reply according to the present invention.

In detail, FIG. 16 shows a preamble detector 20, i.e., a detecting device for detecting an S-mode reply, according to the present invention, which comprises a filter matched to the preamble 21 and a CFAR device 22.

In particular, as shown in FIG. 16, in the CFAR device 22 the signal at output from the filter matched to the preamble 21 is loaded in a shift register or buffer 23 of X cells, each having a time width equal to p µs.

Of the X cells of the buffer 23, the first $X_1$ are once again called "leading cells" 24 and are followed by a first guard cell 25, by a CUT 26, by a second guard cell 27, and by $X_1$ cells once again called "lagging cells" 28, with $2X_1+3=X$.

The samples of the signal at output from the filter matched to the preamble 21 loaded into the buffer 23 are averaged within the corresponding cell in which they are loaded.

As is shown in FIG. 16, said averaged values are then added separately between the leading cells 24 and the lagging cells 28, so as to yield, respectively, a first value, designated once again by U, and a second value, designated once again by V, of which a further average is calculated to yield a third value, designated once again by Z.

This third value Z is multiplied by a factor T.

Unlike in the case of the framing-pulse detector 10, it may be noted that in the preamble detector 20 the detection value $D_T$ is not used. This enables the use of signals at input to the filter matched to the preamble 21 that are not normalized.

The product $Z*T$, which is the detection threshold, is compared with the value Y, which is equal to the average of the samples in the CUT 26, to decide whether Y represents a preamble or not.

In particular, when Y is greater than the detection threshold $Z*T$ a preamble is detected and hence an S-mode reply.

Figure 17:
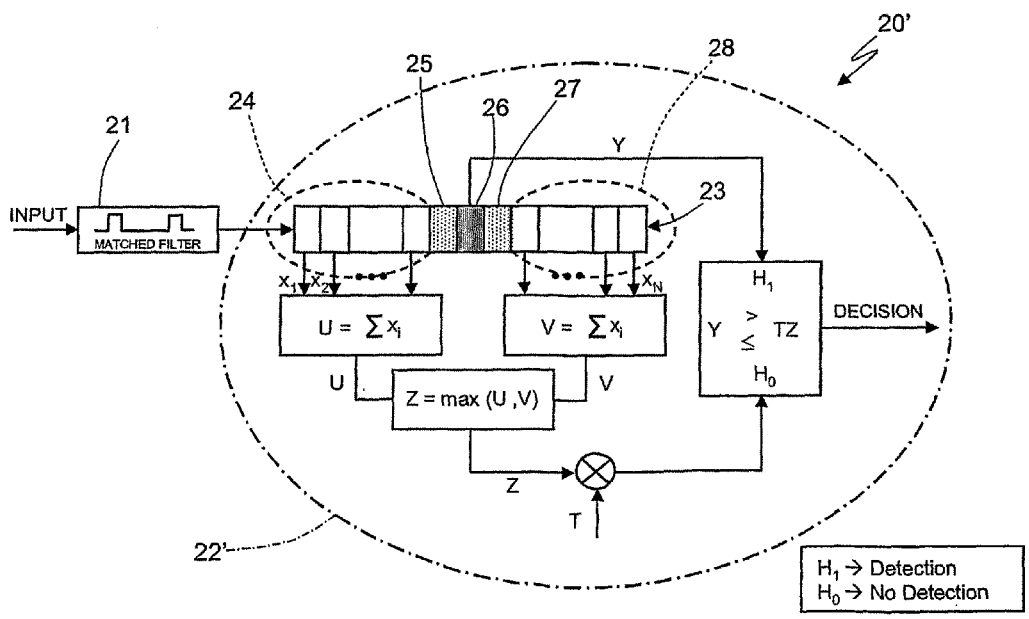
FIG. 17 shows an alternative embodiment of the detector of FIG. 16.

FIG. 17 shows an alternative embodiment 20' of the preamble detector according to the present invention.

In particular, the preamble detector 20' of FIG. 17 differs from the preamble detector 20 of FIG. 16 only in the definition of the third value Z, which, in the preamble detector 20' of FIG. 17, is equal to the highest value between the first value U and the second value V, instead of to their average, as in the preamble detector 20 of FIG. 16.

The preamble detector 20 was tested using a number $X_1$ of leading cells 24 and a number $X_1$ of lagging cells 28 equal to 5, and signals at input to the filter matched to the preamble 21 that were not normalized.

As regards the time width p of each cell, it may be noted that the correlation peak between two pulses each of 0.5 µs has again a width of approximately 1 µs. Consequently, the time width of each cell p was set once again at 1 µs.

In addition, the factor T was determined empirically and set equal to 1.2.

Figure 18:
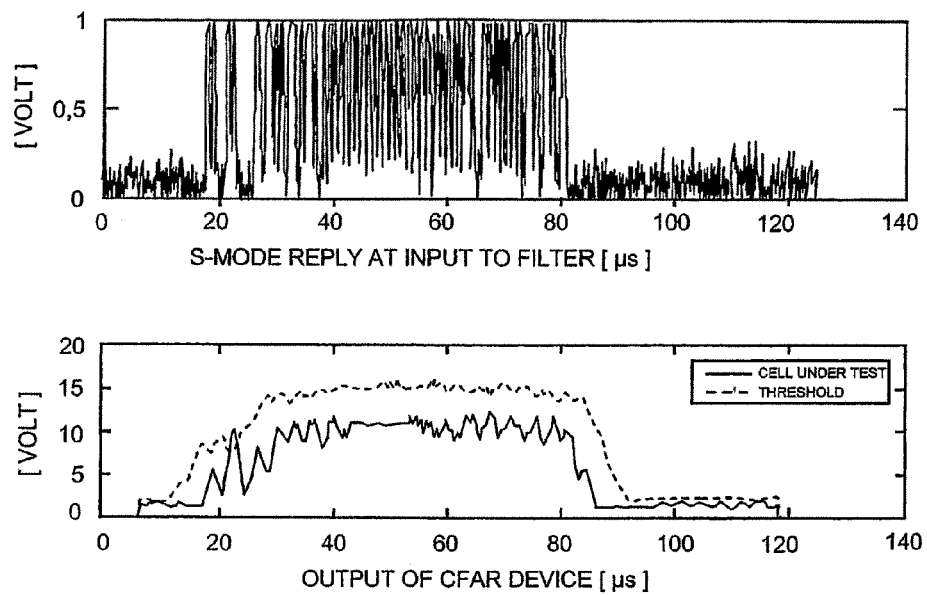
FIG. 18 presents two graphs, where the top one shows the time evolution of an S-mode reply at input to the preamble detector of FIG. 16, and the bottom one shows the time evolution of outputs of the detector of FIG. 16.

FIG. 18 shows, in the graph at the top, the time evolution of an S-mode reply at input to the filter matched to the preamble 21, and, in the graph at the bottom, the time evolution of the signal Y and of the corresponding detection threshold $Z*T$ calculated by the CFAR device 22.

In the graph at the bottom in FIG. 18 it should be noted how the threshold detection $Z*T$ is exceeded by the signal Y only at the correlation peak, which coincides with the passage of the fourth pulse of the preamble in the filter matched to the preamble 21.

Both of the preamble detectors, 20 and 20', were tested and compared with the traditional detection approach, based upon the reconstruction and search for pulses in the canonical positions.

Figure 19:
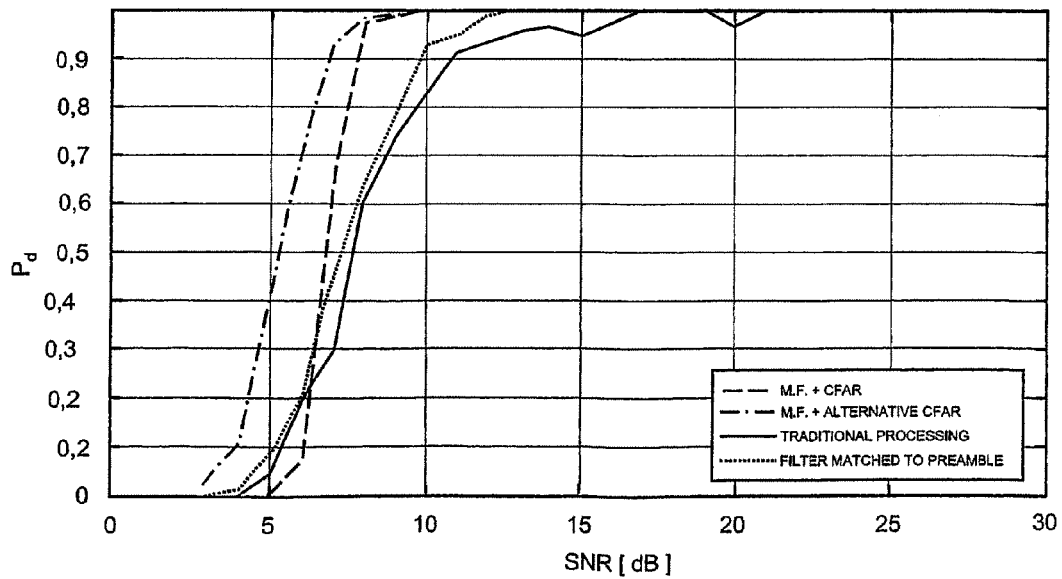
FIG. 19 shows the probability of detection of a preamble of an S-mode reply, for the detectors of FIGS. 16 and 17 and for a traditional detector, as the signal-to-noise ratio in reception varies.

In particular, FIG. 19 shows the evolution of the detection probability $P_d$ as the SNR varies for both of the preamble detectors, 20 and 20', and for the traditional detection approach.

In detail, in FIG. 19 it may be noted how both of the preamble detectors, 20 and 20', gain several decibels of SNR given the same detection probability $P_d$, and, in particular, how the second preamble detector 20', in which the third value Z is equal to the highest value between the first value U and the second value V, is better than the first preamble detector 20.

In addition, in FIG. 19 it may once again be noted how, for an SNR equal to 10 dB, the detection probability $P_d$ is still close to unity for both of the preamble detectors, 20 and 20', whilst for the traditional detection approach it is equal to 80% approximately.

It may be emphasized how in the SSR systems, given the peculiarity of the one-way connection, signals with an SNR less than 10 dB are rarely processed. Consequently, this means that the present invention enables a detection probability $P_d$ close to unity to be obtained throughout the radar coverage.

Also in this case tests were made on S-mode replies immersed in S-mode and A/C-mode FRUITing. There were once again considered 10000 FRUITs per second, of which 70% of A/C mode and 30% of S mode.

The S-mode replies of the known target were received with a power of −50 dBm, corresponding to an average distance, whilst the FRUIT power was varied from −70 dBm to −40 dBm.

Figure 20:
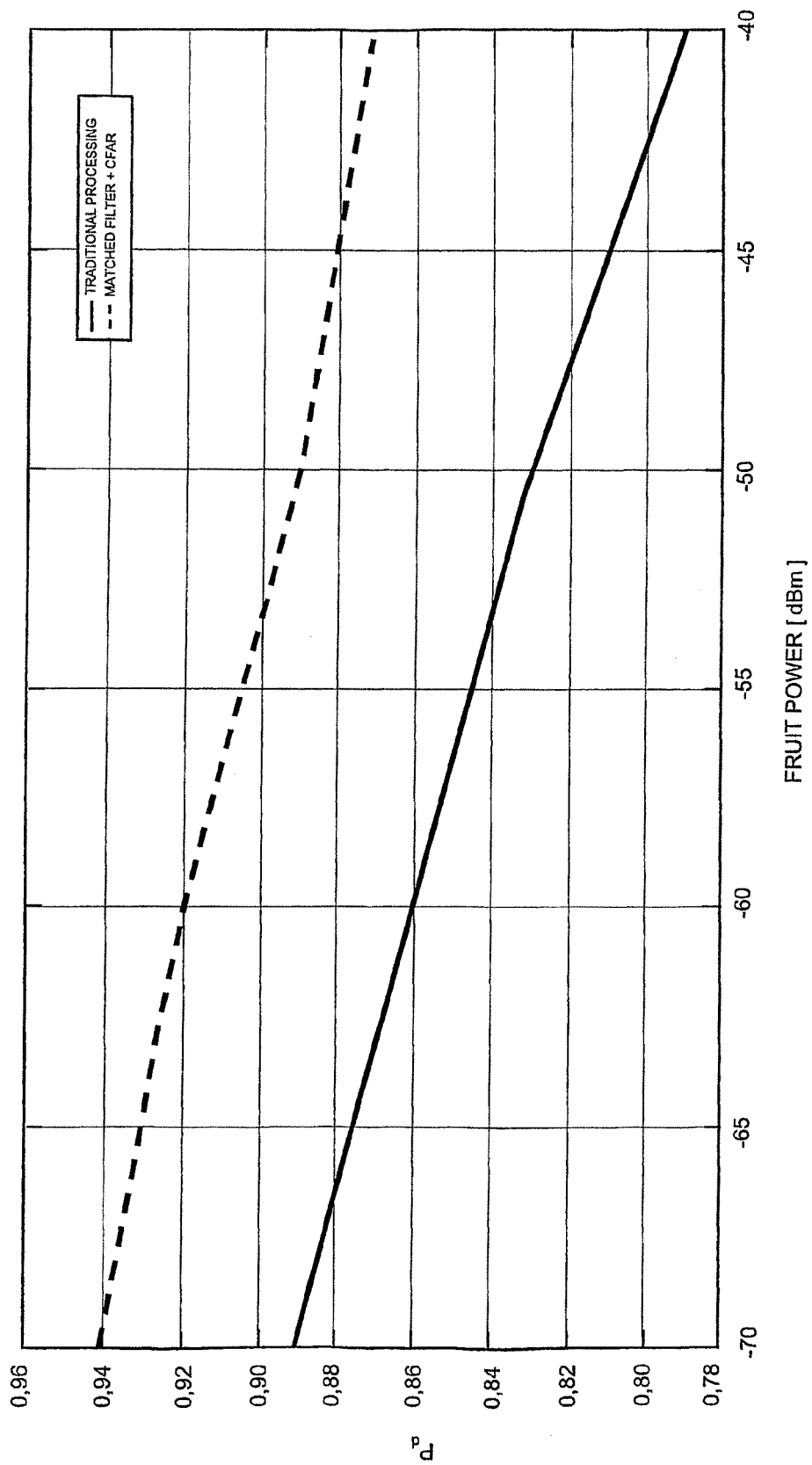
FIG. 20 shows the probability of detection of a preamble of an S-mode reply, for the detector of FIG. 17 and for a traditional detector, as a function of the FRUITing powers, i.e., of the powers of the conventional replies and S-mode replies interfering with one another.

FIG. 20 shows the probability Pd of detection of the preamble of the S-mode replies of the known target, both of the preamble detector 20' tested and according to the traditional detection approach, as a function of the FRUITing powers, i.e., of the powers of the S-mode and A/C-mode replies interfering with one another.

In particular, in FIG. 20 it may be noted how the preamble detection according to the present invention gains several percentage points of detection probability Pd for all the FRUITing powers considered as compared to the traditional detection approach.

From the foregoing description the advantages of the present invention may be readily understood.

In particular, it should be pointed out how, in a FRUIT scenario, or in general a scenario characterized by a high interference, the performance and efficiency of detection of the present invention are considerably higher than those of the traditional detection approach, as is shown by the tests described above.

Finally, it is clear that various modifications can be made to the present invention, all of which fall within the scope of protection of the invention, as defined in the annexed claims.

The invention claimed is:

1. A Secondary Surveillance Radar (SSR) comprising a ground station including an antenna operable to receive an SSR reply signal including one or more S-Mode reply signals each having an S-Mode signal structure with preamble pulses, and/or one or more A/C-Mode reply signals each having an A/C-Mode signal structure with framing pulses; the ground station further including signal processing means coupled with the antenna to receive and process the SSR reply signal, and an S-Mode detector (20; 20') coupled with the signal processing means to receive the processed SSR reply signal and designed to detect the S-Mode reply signal(s) in the SSR reply signal;

the S-Mode detector (20; 20') comprising:
an S-Mode filter (21) matched to the preamble pulses of an S-Mode reply signal and operable to receive and filter the processed SSR reply signal to output an S-Mode filtered signal;
characterized in that the S-Mode detector (20; 20') further comprises:
an S-Mode Constant False Alarm Rate (CFAR) device (22; 22') coupled with the S-Mode filter (21) to receive the S-Mode filtered signal, and designed to detect an S-Mode reply signal in the SSR reply signal, so as to maintain a false alarm rate at a substantially constant value;

and in that the ground station further includes an A/C-Mode detector (10) coupled with the signal processing means to receive the processed SSR reply signal and designed to detect the A/C-Mode reply signal(s) in the SSR reply signal, the A/C-Mode detector (10) comprising:
an A/C-Mode filter (11) matched to the framing pulses of an A/C-Mode reply signal and operable to receive and filter the processed SSR reply signal to output an A/C-Mode filtered signal; and
an A/C-Mode Constant False Alarm Rate (CFAR) device (12) coupled with the A/C-Mode filter (11) to receive the A/C-Mode filtered signal and designed to detect an A/C-Mode reply signal in the SSR reply signal, so as to maintain a false alarm rate at a substantially constant value.

2. The Secondary Surveillance Radar of claim 1, wherein the S-Mode filter (21) is designed to have an impulse response which is a scaled and delayed version of the preamble pulses of an S-Mode reply signal, and wherein the A/C-Mode filter (11) is designed to have an impulse response which is a scaled and delayed version of the framing pulses of an A/C-Mode reply signal.

3. The Secondary Surveillance Radar of claim 2, wherein the S-Mode filter (21) and the A/C-Mode filter (11) are Finite-Impulse-Response (FIR) filters.

4. The Secondary Surveillance Radar of claim 1, wherein the S-Mode Constant False Alarm Rate device (22; 22') is designed to compute an S-Mode detection threshold based on the S-Mode filtered signal and to detect an S-Mode reply signal in the SSR reply signal based on the S-Mode filtered signal and on the S-Mode detection threshold;

and wherein the A/C-Mode Constant False Alarm Rate device (12) is designed to compute an A/C-Mode detection threshold based on the A/C-Mode filtered signal and to detect an A/C-Mode reply signal in the SSR reply signal based on the A/C-Mode filtered signal and on the A/C-Mode detection threshold.

5. The Secondary Surveillance Radar of claim 4, wherein the S-Mode Constant False Alarm Rate device (22; 22') is designed to detect an S-Mode reply signal in the SSR reply signal if a mean value of a first portion of the S-Mode filtered signal satisfies a first given relationship with the S-Mode detection threshold;

and wherein the A/C-Mode Constant False Alarm Rate device (12) is designed to detect an A/C-Mode reply signal in the SSR reply signal if a mean value of a first portion of the A/C-Mode filtered signal satisfies a second given relationship with the A/C-Mode detection threshold.

6. The Secondary Surveillance Radar of claim 5, wherein the S-Mode Constant False Alarm Rate device (22; 22') is designed to detect an S-Mode reply signal in the SSR reply signal if the mean value of the first portion of the S-Mode filtered signal is greater than the S-Mode detection threshold;

and wherein the A/C-Mode Constant False Alarm Rate device (12) is designed to detect an A/C-Mode reply signal in the SSR reply signal if the mean value of the first portion of the A/C-Mode filtered signal is greater than the A/C-Mode detection threshold.

7. The Secondary Surveillance Radar of claim 5, wherein the S-Mode Constant False Alarm Rate device (22; 22') is designed to compute the S-Mode detection threshold based on respective mean values of second portions of the S-Mode filtered signal which do not comprise the first portion of the S-Mode filtered signal;

and wherein the A/C-Mode Constant False Alarm Rate device (12) is designed to compute the A/C-Mode detection threshold based on respective mean values of second portions of the A/C-Mode filtered signal which do not comprise the first portion of the A/C-Mode filtered signal.

8. The Secondary Surveillance Radar of claim 7, wherein the second portions of the S-Mode filtered signal do not comprise guard portions of the S-Mode filtered signal which are adjacent to the first portion of the S-Mode filtered signal; and wherein the second portions of the A/C-Mode filtered signal do not comprise guard portions of the A/C-Mode filtered signal which are adjacent to the first portion of the A/C-Mode filtered signal.

9. A software stored on a non-transitory computer readable medium, loadable into digital-processing means of a ground station of a Secondary Surveillance Radar, and designed to implement, when executed by the digital processing means, the S-Mode detector (20; 20') and the A/C-Mode detector (10) of claim 1.

* * * * *